(12) United States Patent
Premerlani et al.

(10) Patent No.: US 7,117,105 B2
(45) Date of Patent: Oct. 3, 2006

(54) METHOD AND APPARATUS FOR GROUND FAULT PROTECTION

(75) Inventors: William James Premerlani, Scotia, NY (US); Ertugrul Berkcan, Clifton Park, NY (US); Thomas F. Papallo, Farmington, CT (US)

(73) Assignee: General Electric Company, Schenectady, NY (US)

( * ) Notice: Subject to any disclaimer, the term of this patent is extended or adjusted under 35 U.S.C. 154(b) by 209 days.

(21) Appl. No.: 10/373,627

(22) Filed: Feb. 25, 2003

(65) Prior Publication Data

US 2003/0216876 A1 Nov. 20, 2003

Related U.S. Application Data

(60) Provisional application No. 60/359,544, filed on Feb. 25, 2002, provisional application No. 60/438,159, filed on Jan. 6, 2003.

(51) Int. Cl.
*G01R 31/00* (2006.01)

(52) U.S. Cl. .......................................... 702/58; 361/62

(58) Field of Classification Search ............ 702/57–60, 702/64, 72, 83, 90, 91, 93, 104, 126, 116–119, 702/183–185, 189, 193; 700/292–294; 361/65, 93.2, 85, 62, 87; 324/127
See application file for complete search history.

(56) References Cited

U.S. PATENT DOCUMENTS

| | | | |
|---|---|---|---|
| 3,772,505 A | 11/1973 | Massell | |
| 3,938,007 A | 2/1976 | Boniger et al. | |
| 3,956,671 A | 5/1976 | Nimmersjo | |
| 3,963,964 A | 6/1976 | Mustaphi | |
| 4,001,742 A | 1/1977 | Jencks et al. | |
| 4,107,778 A * | 8/1978 | Nii et al. ....................... 702/59 |
| 4,245,318 A | 1/1981 | Eckart et al. | |
| 4,291,299 A | 9/1981 | Hinz et al. | |
| 4,301,433 A | 11/1981 | Castonguay et al. | |
| 4,311,919 A | 1/1982 | Nail | |

(Continued)

FOREIGN PATENT DOCUMENTS

EP 0718948 A2 6/1996

(Continued)

OTHER PUBLICATIONS

Atanackovic D. et al. An Integrated Knowledge-Based Model For Power-System Planning IEEE Expert, IEEE Inc. New York, Jul. 1997; pp. 65-71.

*Primary Examiner*—Marc S. Hoff
*Assistant Examiner*—Mohamed Charioui
(74) *Attorney, Agent, or Firm*—Ohlandt, Greeley, Ruggiero & Perle, L.L.P.

(57) ABSTRACT

A method and apparatus for monitoring a centrally controlled power distribution system is provided. The method includes sampling an electrical current flow in the centrally controlled power distribution system, transmitting the sampled current signals to a central control processing unit, determining a ground fault presence and location based on the current signals received from all of the node electronics units, and isolating the determined ground fault by opening circuit breakers supplying power to the fault. The apparatus is configured to sample an electrical current flow in the centrally controlled power distribution system, transmit the sampled current signals associated with each circuit breaker to a central control processing unit, determine a ground fault presence and location based on the current signals received from all of the node electronics units in the power distribution system, and isolate the determined ground fault by opening circuit breakers supplying power to the fault.

17 Claims, 7 Drawing Sheets

U.S. PATENT DOCUMENTS

| | | |
|---|---|---|
| 4,415,968 A | 11/1983 | Maeda et al. |
| 4,423,459 A | 12/1983 | Stich et al. |
| 4,432,031 A | 2/1984 | Premerlani |
| 4,455,612 A | 6/1984 | Girgis et al. |
| 4,468,714 A | 8/1984 | Russell |
| 4,589,074 A | 5/1986 | Thomas et al. |
| 4,623,949 A | 11/1986 | Salowe et al. |
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,799,005 A * | 1/1989 | Fernandes ............... 324/127 |
| 4,827,369 A * | 5/1989 | Saletta et al. ............. 361/96 |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,113,304 A * | 5/1992 | Ozaki et al. ............... 361/87 |
| 5,132,867 A * | 7/1992 | Klancher .................. 361/62 |
| 5,134,691 A | 7/1992 | Elms |
| 5,136,458 A * | 8/1992 | Durivage, III ............ 361/93.2 |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,181,026 A * | 1/1993 | Granville ............... 340/870.28 |
| 5,182,547 A | 1/1993 | Griffith |
| 5,185,705 A * | 2/1993 | Farrington ............... 700/292 |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A * | 4/1995 | Hill ............... 702/72 |
| 5,414,635 A | 5/1995 | Ohta |
| 5,420,799 A | 5/1995 | Peterson et al. |
| 5,422,778 A | 6/1995 | Good et al. |
| 5,428,495 A * | 6/1995 | Murphy et al. ............ 361/85 |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,498,956 A * | 3/1996 | Kinney et al. ............ 324/142 |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A * | 2/1997 | Engel et al. ............... 361/93.2 |
| 5,608,646 A | 3/1997 | Pomatto |
| 5,613,798 A | 3/1997 | Braverman |
| 5,619,392 A | 4/1997 | Bertsch et al. |
| 5,621,776 A * | 4/1997 | Gaubatz ............... 376/242 |
| 5,627,716 A | 5/1997 | Lagree et al. |
| 5,627,717 A * | 5/1997 | Pein et al. ............... 361/95 |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A | 11/1999 | Hart |
| 6,005,757 A * | 12/1999 | Shvach et al. ............ 361/64 |
| 6,005,758 A | 12/1999 | Spencer et al. |
| 6,018,451 A | 1/2000 | Lyke et al. |

| | | | | | | |
|---|---|---|---|---|---|---|
| 6,038,516 | A | 3/2000 | Alexander et al. | 6,441,931 B1 | 8/2002 | Moskovich et al. |
| 6,047,321 | A | 4/2000 | Raab et al. | 6,459,997 B1 | 10/2002 | Anderson |
| 6,054,661 | A | 4/2000 | Castonguay et al. | 6,496,342 B1 | 12/2002 | Horvath et al. |
| 6,055,145 | A | 4/2000 | Lagree et al. | 6,535,797 B1 | 3/2003 | Bowles et al. |
| 6,061,609 | A | 5/2000 | Kanoi et al. | 6,549,880 B1 | 4/2003 | Willoughby et al. |
| 6,084,758 | A | 7/2000 | Clarey et al. | 6,553,418 B1 | 4/2003 | Collins et al. |
| 6,138,241 | A | 10/2000 | Eckel et al. | 6,571,182 B1 * | 5/2003 | Adamiak et al. ............ 702/64 |
| 6,139,327 | A | 10/2000 | Callahan et al. | 6,694,271 B1 * | 2/2004 | Hannon ...................... 702/58 |
| 6,141,196 | A | 10/2000 | Premerlani et al. | 2001/0010032 A1 | 7/2001 | Ehlers et al. |
| 6,157,527 | A | 12/2000 | Spencer et al. | 2001/0032025 A1 | 10/2001 | Lenz et al. |
| 6,167,329 | A | 12/2000 | Engel et al. | 2001/0044588 A1 | 11/2001 | Mault |
| 6,175,780 B1 * | | 1/2001 | Engel ........................ 700/293 | 2001/0048354 A1 | 12/2001 | Douville et al. |
| 6,185,482 | B1 | 2/2001 | Egolf et al. | 2001/0055965 A1 | 12/2001 | Delp et al. |
| 6,185,508 | B1 | 2/2001 | Van Doorn et al. | 2002/0010518 A1 | 1/2002 | Reid et al. |
| 6,186,842 | B1 | 2/2001 | Hirschbold et al. | 2002/0032535 A1 | 3/2002 | Alexander et al. |
| 6,195,243 | B1 | 2/2001 | Spencer et al. | 2002/0034086 A1 | 3/2002 | Scoggins et al. |
| 6,198,402 | B1 | 3/2001 | Hasegawa et al. | 2002/0045992 A1 | 4/2002 | Shincovich et al. |
| 6,212,049 | B1 | 4/2001 | Spencer et al. | 2002/0059401 A1 | 5/2002 | Austin |
| 6,233,128 | B1 | 5/2001 | Spencer et al. | 2002/0063635 A1 | 5/2002 | Shincovich |
| 6,236,949 | B1 | 5/2001 | Hart | 2002/0064010 A1 | 5/2002 | Nelson et al. |
| 6,242,703 | B1 | 6/2001 | Castonguay et al. | 2002/0091949 A1 | 7/2002 | Ykema |
| 6,268,991 | B1 | 7/2001 | Criniti et al. | 2002/0094799 A1 | 7/2002 | Elliott et al. |
| 6,285,917 | B1 | 9/2001 | Sekiguchi et al. | 2002/0107615 A1 | 8/2002 | Bjorklund |
| 6,288,882 | B1 | 9/2001 | DiSalvo et al. | 2002/0108065 A1 | 8/2002 | Mares |
| 6,289,267 | B1 | 9/2001 | Alexander et al. | 2002/0109722 A1 | 8/2002 | Rogers et al. |
| 6,291,911 | B1 | 9/2001 | Dunk et al. | 2002/0111980 A1 | 8/2002 | Miller et al. |
| 6,292,340 | B1 | 9/2001 | O'Regan et al. | 2002/0116092 A1 | 8/2002 | Hamamatsu et al. |
| 6,292,717 | B1 | 9/2001 | Alexander et al. | 2002/0124011 A1 | 9/2002 | Baxter et al. |
| 6,292,901 | B1 | 9/2001 | Lys et al. | 2002/0146076 A1 | 10/2002 | Lee |
| 6,297,939 | B1 | 10/2001 | Bilac et al. | 2002/0146083 A1 | 10/2002 | Lee et al. |
| 6,313,975 | B1 | 11/2001 | Dunne et al. | 2002/0147503 A1 | 10/2002 | Osburn, III |
| 6,341,054 | B1 | 1/2002 | Walder et al. | 2002/0159402 A1 | 10/2002 | Binder |
| 6,347,027 | B1 | 2/2002 | Nelson et al. | 2002/0162014 A1 | 10/2002 | Przydatek et al. |
| 6,351,823 | B1 | 2/2002 | Mayer et al. | 2002/0163918 A1 | 11/2002 | Cline |
| 6,356,422 | B1 | 3/2002 | Bilac et al. | 2002/0165677 A1 | 11/2002 | Lightbody et al. |
| 6,356,849 | B1 | 3/2002 | Jaffe | 2002/0181174 A1 | 12/2002 | Bilac et al. |
| 6,369,996 | B1 | 4/2002 | Bo | 2002/0193888 A1 | 12/2002 | Wewalaarachchi et al. |
| 6,377,051 | B1 | 4/2002 | Tyner et al. | 2003/0043785 A1 | 3/2003 | Liu et al. |
| 6,385,022 | B1 | 5/2002 | Kulidjian et al. | | | |
| 6,396,279 | B1 | 5/2002 | Gruenert | FOREIGN PATENT DOCUMENTS | | |
| 6,397,155 | B1 | 5/2002 | Przydatek et al. | EP 0723325 A1 | 7/1996 | |
| 6,405,104 | B1 | 6/2002 | Dougherty | EP 0949734 A2 | 10/1999 | |
| 6,406,328 | B1 | 6/2002 | Attarian et al. | | | |
| 6,411,865 | B1 | 6/2002 | Qin et al. | * cited by examiner | | |

METHOD AND APPARATUS FOR GROUND FAULT PROTECTION

CROSS REFERENCE TO RELATED APPLICATIONS

This application is related to U.S. patent application Ser. No. 60/359,544 filed on Feb. 25, 2002 for "Integrated Protection, Monitoring, and Control" the content of which is incorporated in its entirety herein by reference. This application is also related to U.S. patent application Ser. No. 60/438,159 filed on Jan. 6, 2003 for "Single Processor Concept for Protection and Control of Circuit Breakers in Low-Voltage Switchgear" the content of which is incorporated in its entirety herein by reference.

BACKGROUND OF THE INVENTION

This invention relates generally to electrical switchgear and more particularly, to a method and apparatus for facilitating monitoring and protecting a centrally controlled power distribution system.

In an industrial power distribution system, power generated by a power generation company may be supplied to an industrial or commercial facility wherein the power may be distributed throughout the industrial or commercial facility to various equipment such as, for example, motors, welding machinery, computers, heaters, lighting, and other electrical equipment. At least some known power distribution systems include switchgear which facilitates dividing the power into branch circuits which supply power to various portions of the industrial facility. Circuit breakers are provided in each branch circuit to facilitate protecting equipment within the branch circuit. Additionally, circuit breakers in each branch circuit can facilitate minimizing equipment failures since specific loads may be energized or de-energized without affecting other loads, thus creating increased efficiencies, and reduced operating and manufacturing costs. Similar switchgear may also be used within an electric utility transmission system and a plurality of distribution substations, although the switching operations used may be more complex.

Switchgear typically include multiple devices, other than the power distribution system components, to facilitate providing protection, monitoring, and control of the power distribution system components. For example, at least some known breakers include a plurality of shunt trip circuits, under-voltage relays, trip units, and a plurality of auxiliary switches that close the breaker in the event of an undesired interruption or fluctuation in the power supplied to the power distribution components. Additionally, at least one known power distribution system also includes a monitor device that monitors a performance of the power distribution system, a control device that controls an operation of the power distribution system, and a protection device that initiates a protective response when the protection device is activated.

In at least some other known power distribution systems, a monitor and control system operates independently of the protective system. For example, a protective device may de-energize a portion of the power distribution system based on its own predetermined operating limits, without the monitoring devices recording the event. The failure of the monitoring system to record the system shutdown may mislead an operator to believe that an over-current condition has not occurred within the power distribution system, and as such, a proper corrective action may not be initiated by the operator. Additionally, a protective device, i.e. a circuit breaker, may open because of an over-current condition in the power distribution system, but the control system may interpret the over-current condition as a loss of power from the power source, rather than a fault condition. As such, the control logic may undesirably attempt to connect the faulted circuit to an alternate source, thereby restoring the over-current condition. In addition to the potential increase in operational defects which may occur using such devices, the use of multiple devices and interconnecting wiring associated with the devices may cause an increase in equipment size, an increase in the complexity of wiring the devices, and/or an increase in a quantity of devices installed.

BRIEF DESCRIPTION OF THE INVENTION

In one aspect, a method for monitoring a centrally controlled power distribution system is provided. The power distribution system includes a plurality of circuit breakers, each circuit breaker communicatively coupled to a single node electronics unit, each node electronics unit located remotely from its respective circuit breaker, and each node electronics unit communicatively coupled to at least one central control processing unit through at least one digital network. The method includes sampling an electrical current flow in the centrally controlled power distribution system proximate each circuit breaker in the centrally controlled power distribution system wherein said sampling is time synchronized by the central control processing unit, transmitting the sampled current signals associated with each circuit breaker to a central control processing unit, determining a ground fault presence and location in the power distribution system based on the current signals received from all of the node electronics units in the power distribution system; and isolating the determined ground fault by opening circuit breakers supplying power to the fault.

In another aspect, an apparatus for monitoring a centrally controlled power distribution system is provided. The system includes a plurality of circuit breakers, each circuit breaker communicatively coupled to a single node electronics unit, each node electronics unit located remotely from its respective circuit breaker, and each node electronics unit communicatively coupled to at least one central control processing unit through at least one digital network. The apparatus is configured to sample an electrical current flow in said centrally controlled power distribution system proximate each circuit breaker in said centrally controlled power distribution system wherein each sample is time synchronized by said central control processing unit, transmit said sampled current signals associated with each circuit breaker to a central control processing unit, determine a ground fault presence and location in said power distribution system based on said current signals received from all of said node electronics units in said power distribution system, and isolate said determined ground fault by opening circuit breakers supplying power to said fault.

DETAILED DESCRIPTION OF THE INVENTION

Figure 1:
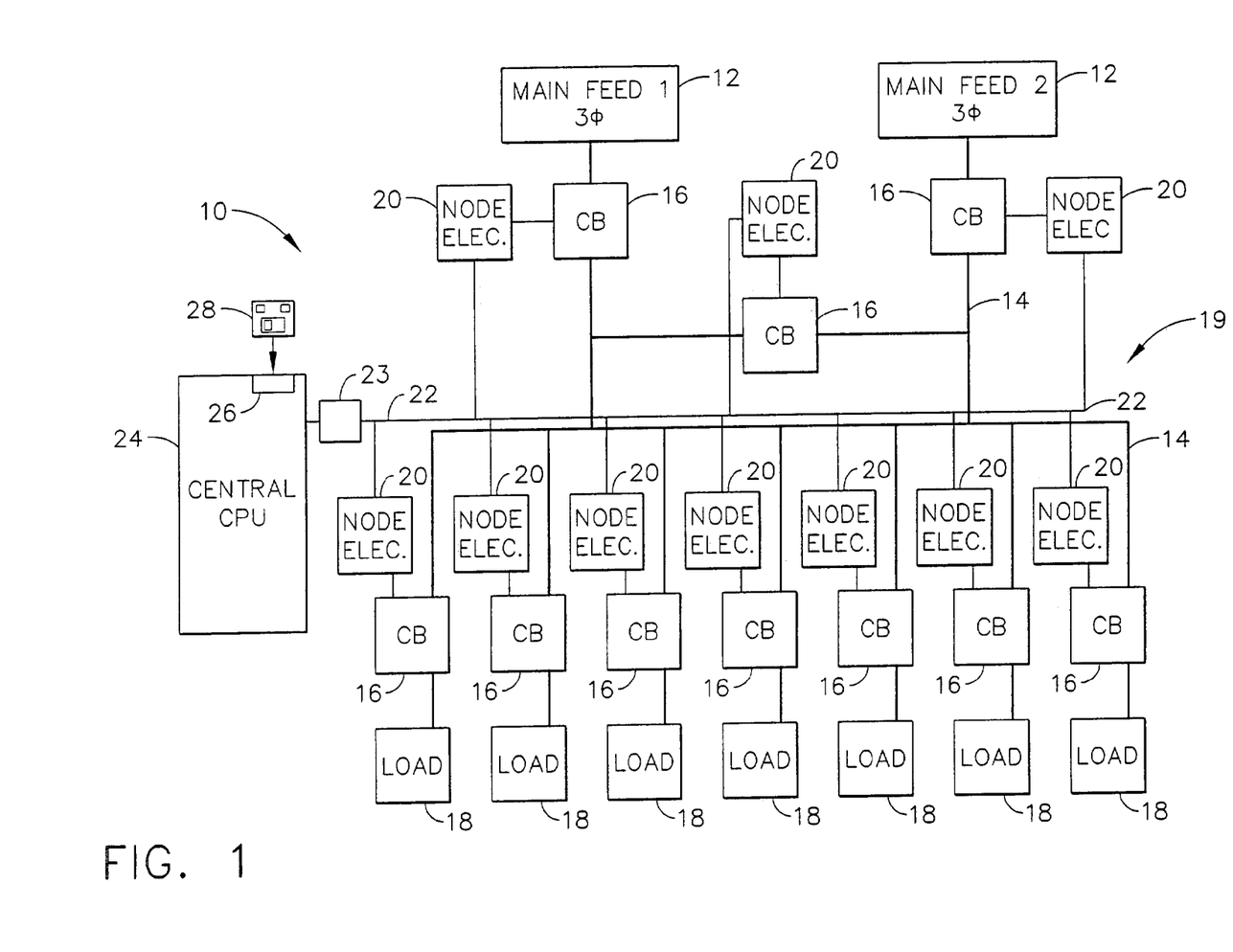
FIG. 1 is an exemplary schematic illustration of a power distribution system.

FIG. 1 illustrates an exemplary schematic illustration of a power distribution system 10, used by an industrial facility for example. In an exemplary embodiment, system 10 includes at least one main feed system 12, a power distribution bus 14, a plurality of power circuit switches or interrupters, also referred to herein as a circuit breakers (CB) 16, and at least one load 18, such as, but not limited to, motors, welding machinery, computers, heaters, lighting, and/or other electrical equipment.

In use, power is supplied to a main feed system 12, i.e. a switchboard for example, from a source (not shown) such as, an electric generator driven by a prime mover locally, or an electric utility source from an electrical substation. The prime mover may be powered from, for example, but not limited to, a turbine, or an internal combustion engine. Power supplied to main feed system 12 is divided into a plurality of branch circuits by a plurality of busbars configured to route the power from a branch feed breaker and a bus-tie breaker to a plurality of load circuit breakers 16 which supply power to various loads 18 in the industrial facility. In addition, circuit breakers 16 are provided in each branch circuit to facilitate protecting equipment, i.e. loads 18, connected within the respective branch circuit. Additionally, circuit breakers 16 facilitate minimizing equipment failures since specific loads 18 may be energized or de-energized without affecting other loads 18, thus creating increased efficiencies, and reduced operating and manufacturing costs.

Power distribution system 10 includes a circuit breaker control protection system 19 that includes a plurality of node electronics units 20 that are each communicatively coupled to a digital network 22 via a network interface controller switch 23 such as, but not limited to, an Ethernet switch 23. Circuit breaker control protection system 19 also includes at least one central control processing unit (CCPU) 24 that is communicatively coupled to digital network 22. In use, each respective node electronic unit 20 is electrically coupled to a respective circuit breaker 16, such that CCPU 24 is communicatively coupled to each circuit breaker 16 through digital network 22 and through an associated node electronic unit 20.

In one embodiment, digital network 22 includes, for example, at least one of a local area network (LAN) or a wide area network (WAN), dial-in-connections, cable modems, and special high-speed ISDN lines. Digital network 22 also includes any device capable of interconnecting to the Internet including a web-based phone, personal digital assistant (PDA), or other web-based connectable equipment.

In one embodiment, CCPU 24 is a computer and includes a device 26, for example, a floppy disk drive or CD-ROM drive, to facilitate reading instructions and/or data from a computer-readable medium 28, such as a floppy disk or CD-ROM. In another embodiment, CCPU 24 executes instructions stored in firmware (not shown). CCPU 24 is programmed to perform functions described herein, but other programmable circuits can likewise be programmed. Accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Additionally, although described in a power distribution setting, it is contemplated that the benefits of the invention accrue to all electrical distribution systems including industrial systems such as, for example, but not limited to, an electrical distribution system installed in an office building.

Figure 2:
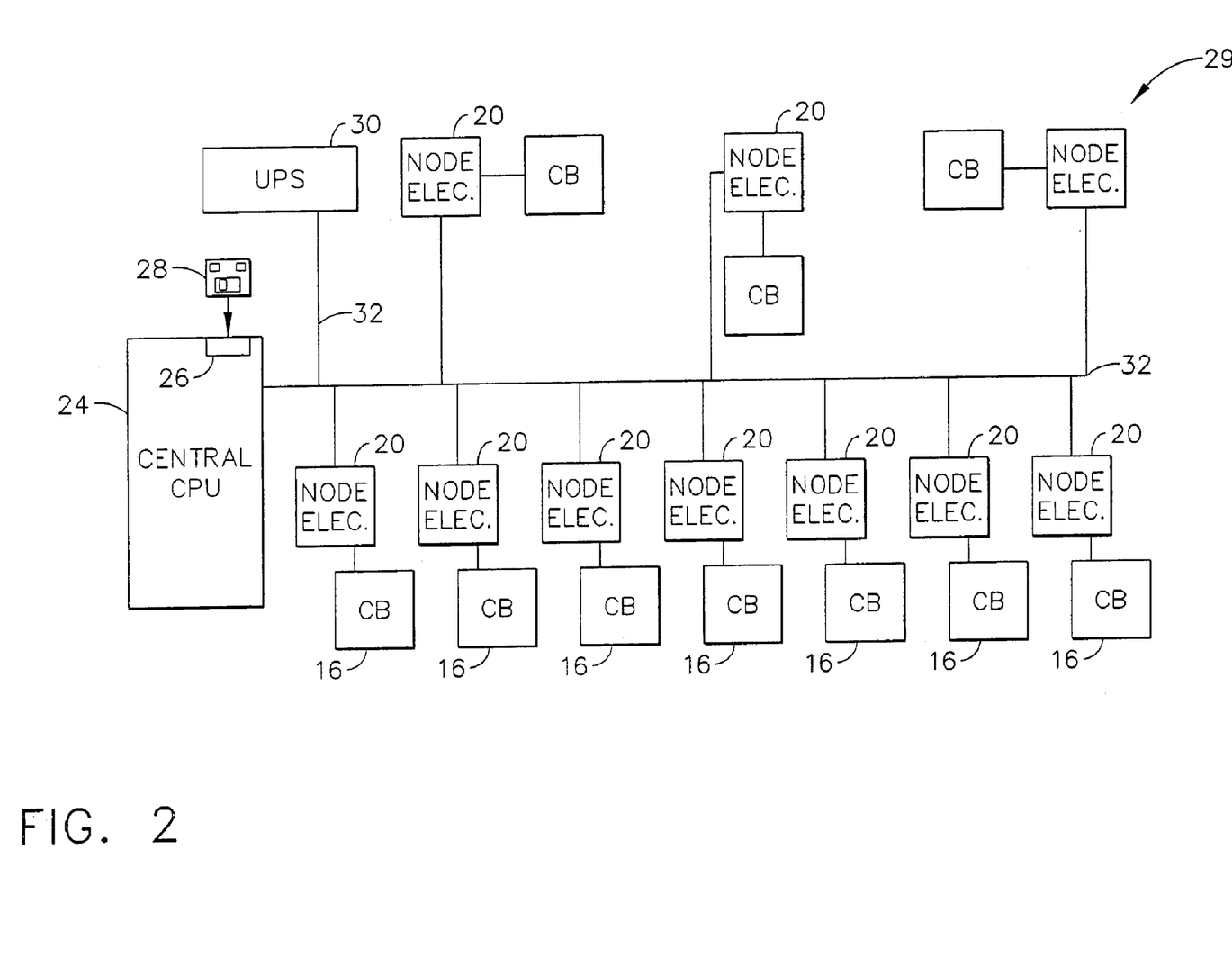
FIG. 2 is an exemplary schematic illustration of a node power system.

FIG. 2 is an exemplary schematic illustration of a node power distribution system 29 that can be used with power distribution system 10 (shown in FIG. 1) and more specifically, with circuit breaker control protection system 19 (shown in FIG. 1). Node power distribution system 29 includes a power source 30 that is electrically coupled to node electronic units 20 through a node power distribution bus 32. In an exemplary embodiment, power source 30 is an uninterruptible power supply (UPS). In one embodiment, power source 30 receives power from power system 10 and then distributes this power to node electronic units 20 through node power distribution bus 32. In an alternative embodiment, power is not supplied to power source 30, but rather, power source 30 supplies power to node electronic units 20 using an internal power supply, such as, but not limited to, a plurality of batteries (not shown). In another alternate embodiment, node electronic units 20 are powered by secondary current available from current sensor 82 and/or voltage sensor 84. In this embodiment, circuit breaker control protection system 19 would not include node power distribution system 29, power source 30, or node power distribution bus 32

Figure 3:
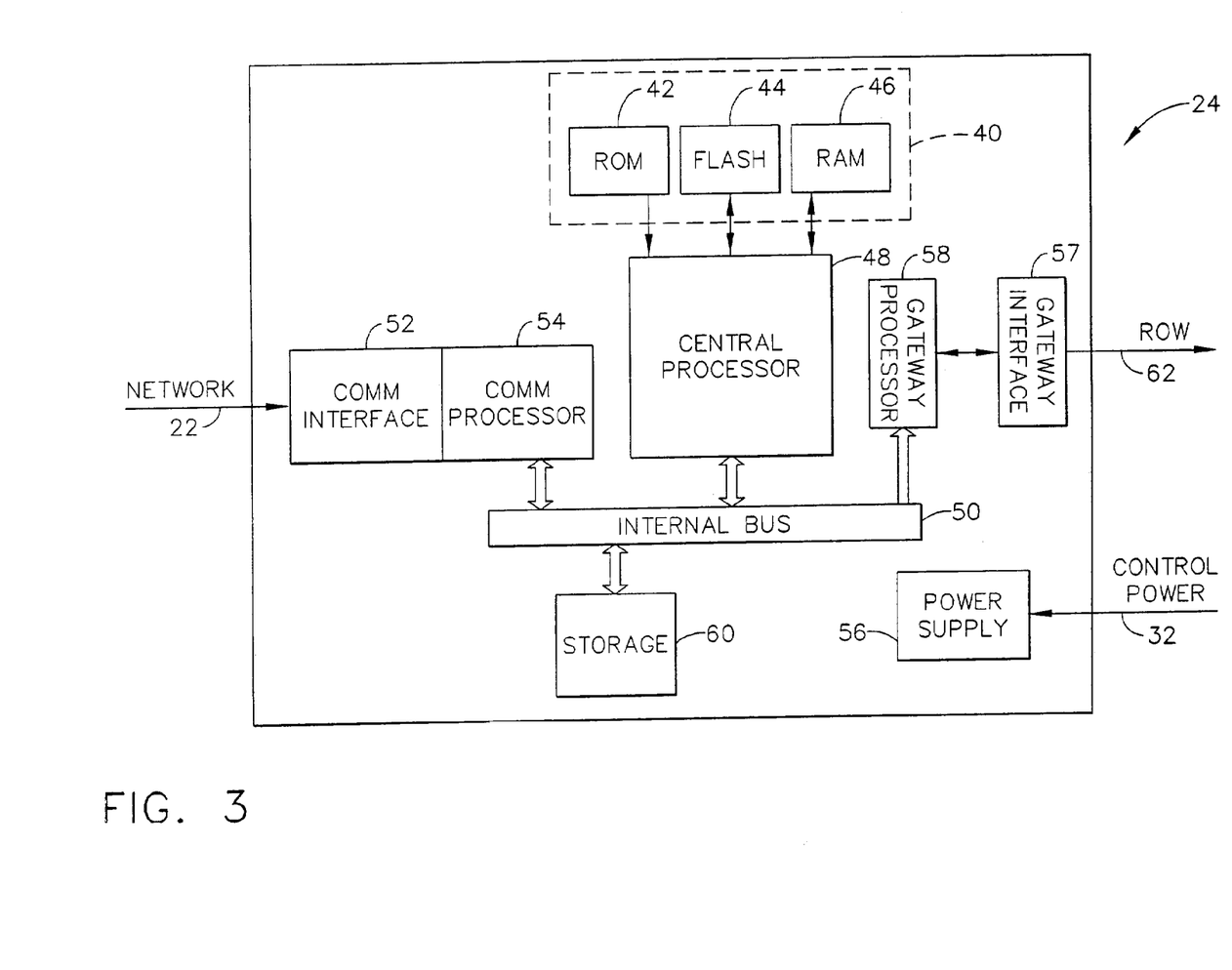
FIG. 3 is an exemplary schematic illustration of a central control processing unit that may used with the power distribution system shown in FIG. 1.

FIG. 3 is an exemplary schematic illustration of CCPU 24. CCPU 24 includes at least one memory device 40, such as, but not limited to, a read only memory (ROM) 42, a flash memory 44, and/or a random access memory (RAM) 46. CCPU 24 also includes a central processor unit (CPU) 48 that is electrically coupled to at least one memory device 40, as well as an internal bus 50, a communications interface 52, and a communications processor 54. In an exemplary embodiment, CCPU 24 is a printed circuit board and includes a power supply 56 to supply power to a plurality of devices on the printed circuit board.

Additionally, in an exemplary embodiment, internal bus 50 includes an address bus, a data bus, and a control bus. In use, the address bus is configured to enable CPU 48 to address a plurality of internal memory locations or an input/output port, such as, but not limited to communications interface 52 through communications processor 54, and a gateway interface 57, through a gateway processor 58. The data bus is configured to transmit instructions and/or data between CPU 48 and at least one input/output, and the control bus is configured to transmit signals between the plurality of devices to facilitate ensuring that the devices are operating in synchronization. In the exemplary embodiment, internal bus 50 is a bi-directional bus such that signals can be transmitted in either direction on internal bus 50. CCPU 24 also includes at least one storage device 60 configured to store a plurality of information transmitted via internal bus 50.

In use, gateway interface 57 communicates to a remote workstation (not shown) via an Internet link 62 or an Intranet 62. In the exemplary embodiment, the remote workstation is a personal computer including a web browser. Although a single workstation is described, such functions as described herein can be performed at one of many personal computers coupled to gateway interface 57. For example, gateway interface 57 may be communicatively coupled to various individuals, including local operators and to third parties, e.g., remote system operators via an ISP Internet connection. The communication in the example embodiment is illustrated as being performed via the Internet, however, any other wide area network (WAN) type communication can be utilized in other embodiments, i.e., the systems and processes are not limited to being practiced via the Internet. In one embodiment, information is received at gateway interface 57 and transmitted to node electronic unit 20 via CCPU 24 and digital network 22. In another embodiment, information sent from node electronic unit 24 is received at communication interface 52 and transmitted to Internet 62 via gateway interface 57.

Figure 4:
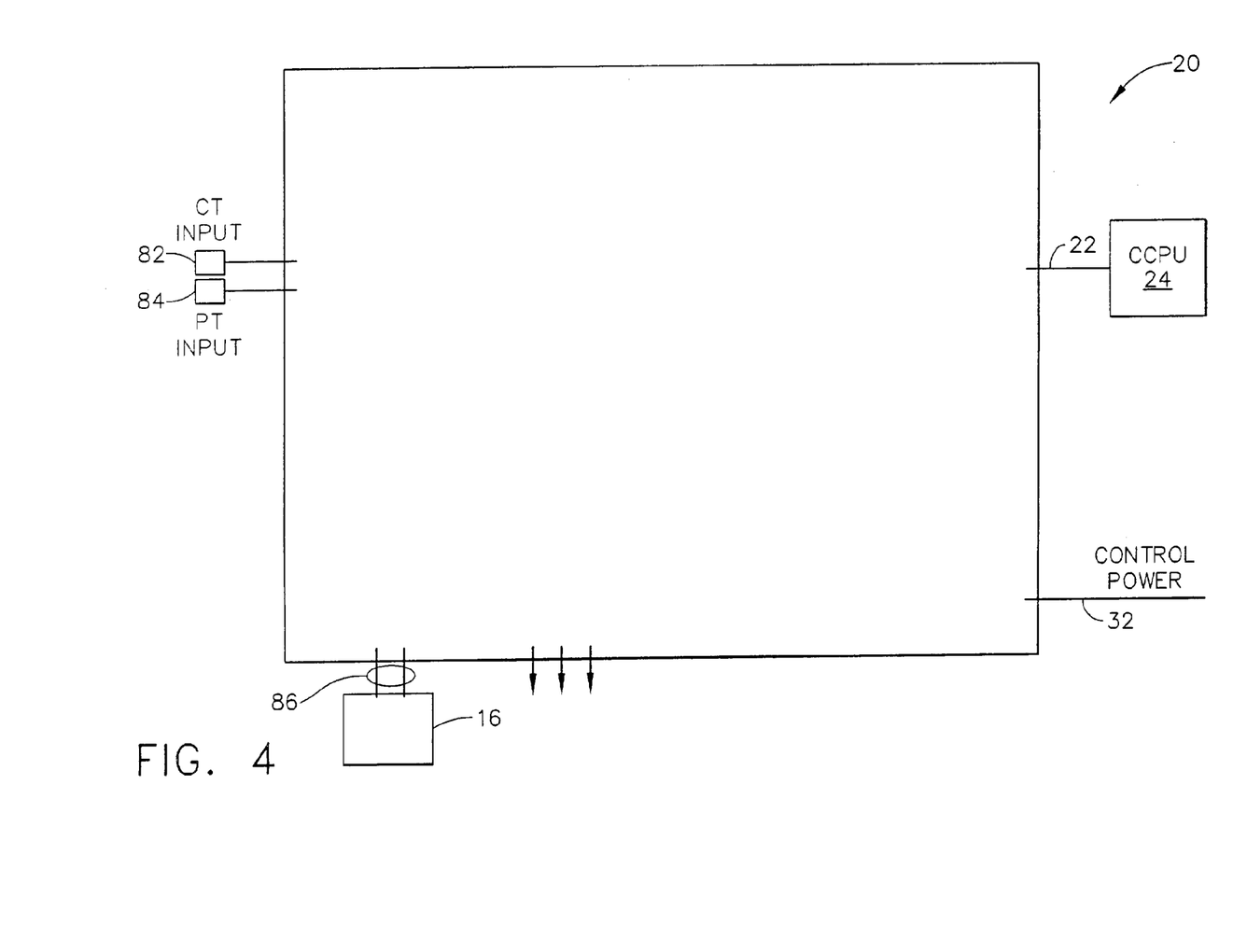
FIG. 4 is an exemplary schematic illustration of a node electronic unit that may used with the power distribution system shown in FIG. 1.

FIG. 4 is an exemplary schematic illustration of single node electronic unit 20. In the exemplary embodiment, node electronic unit 20 is a unitary device mounted remotely from CCPU 24 and circuit breaker 16. In an exemplary embodiment, node electronic unit 20 is separate from, but proximate to circuit breaker 16.

In one embodiment, node electronics unit 20 receives signals input from a plurality of devices, such as, but not limited to, a current sensor 82, and a voltage sensor 84, and/or circuit breaker 16. A plurality of inputs from the circuit breaker 16 are provided as status input 86, and these inputs may include inputs, such as, but not limited to, an auxiliary switch status, and a spring charge switch status. Additionally, node electronics unit 20 sends status input 86 to at least circuit breaker 16 in order to control one or more states of the circuit breaker 16.

In use, the status inputs 86 and signals received from current transformer 82, and potential transformer 84 are transmitted to CCPU 24 via node electronics unit 20, and digital network 22. Node electronics unit 20 receives the status inputs 86, current sensor 82, and voltage sensor 84, and packages a digital message that includes the input and additional data relating to a health and status of node electronics unit 20. The health and status data may include information based on problems found by internal diagnostic routines and a status of self checking routines that run locally in node electronics unit 20. CCPU 24 processes digital message 85 using one or more protection algorithms, monitoring algorithms, and any combination thereof. In response to the processing of digital message 85, CCPU 24 sends digital message 85 back to node electronics unit 20 via digital network 22. In the exemplary embodiment, node electronics unit 20 actuates circuit breaker 16 in response to the signal received from CCPU 24. In one embodiment, circuit breaker 16 is actuated in response to commands sent only by CCPU 24, i.e., circuit breaker 16 is not controlled locally by node 20, but rather is operated remotely from CCPU 24 based on inputs received from current sensor 82, voltage sensor 84, and status inputs 86 received from node electronics unit 20 over network 22.

Figure 5:
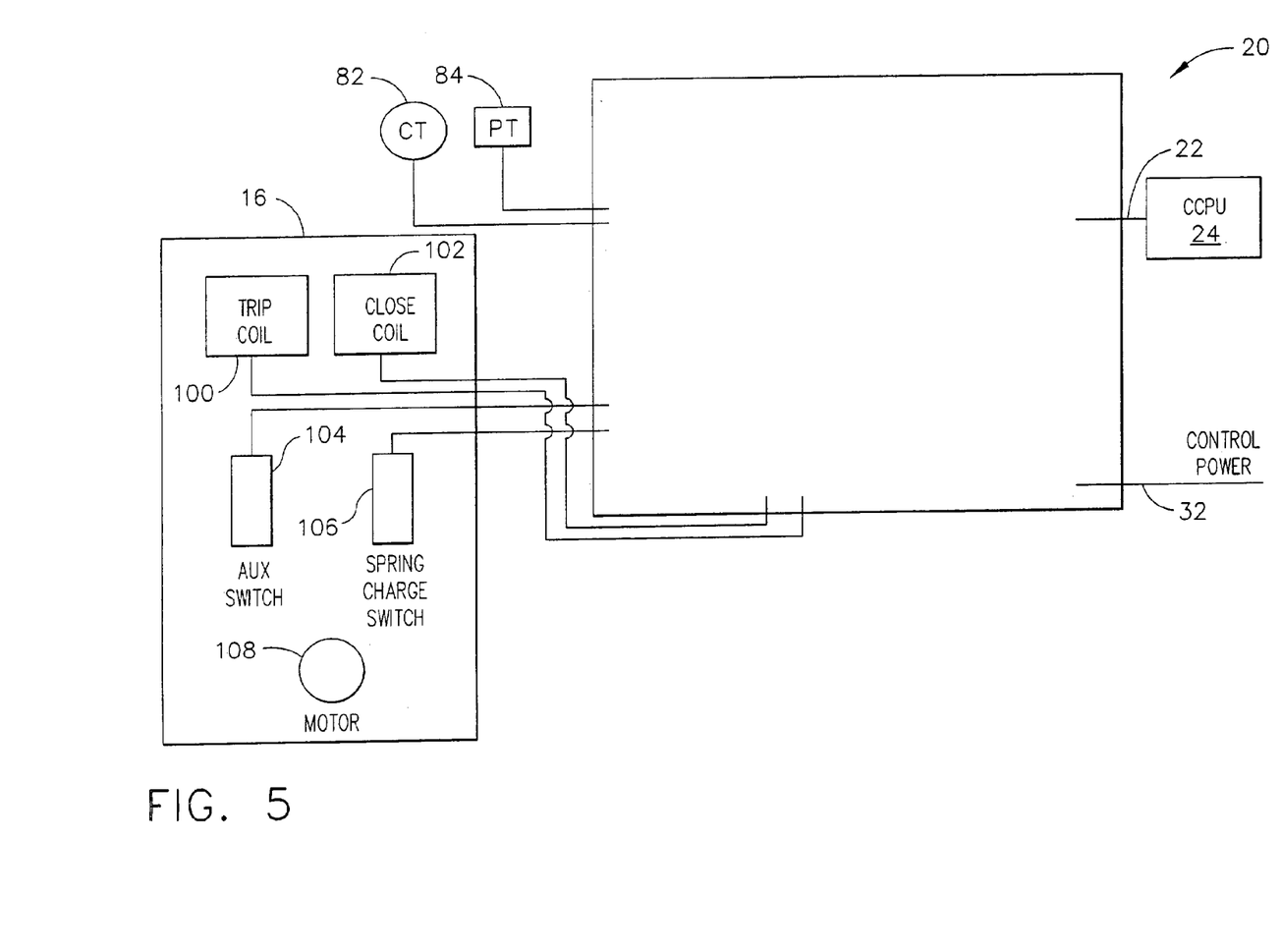
FIG. 5 is an exemplary schematic illustration of a circuit breaker that may used with the power distribution system shown in FIG. 1.

FIG. 5 is an exemplary schematic illustration of circuit breaker 16 that is electrically coupled to node electronics unit 20. In the exemplary embodiment, circuit breaker 16 includes a switch assembly that includes movable and/or stationary contacts, an arc suppression means, and a tripping and operating mechanism. Circuit breaker 16 auxiliaries include only a trip coil 100, a close coil 102, an auxiliary switch 104, an operating spring charge switch 106, and a motor 108. Circuit breaker 16 does not include a trip unit. Auxiliary switches and sensors are coupled to node electronics unit 20 through a wiring harness, which may include both copper wiring and communications conduits. Current sensor 82, and voltage sensor 84 are coupled to node electronics unit 20 through a cable that may include copper wiring and/or communications conduits. Circuit breaker 16 is a unitary device mounted proximate to CCPU 20, current sensor 82, and voltage sensor 84.

In use, actuation signals from node electronics unit 20 are transmitted to circuit breaker 16 to actuate a plurality of functions in circuit breaker 16, such as, but not limited to, operating a trip coil 100, operating a close coil 102, and affecting a circuit breaker lockout feature. An auxiliary switch 104 and operating spring charge switch 106 provide a status indication of circuit breaker parameters to node electronics unit 20. Motor 108 is configured to recharge an operating spring, configured as a close spring (not shown) after circuit breaker 16 closes. It should be appreciated that the motor 108 can include, for example, a spring charge switch, a solenoid or any other electromechanical device capable of recharging a trip spring. To close circuit breaker 16, a close coil 102 is energized by a close signal from actuation power module (not shown). Close coil 102 actuates a closing mechanism (not shown) that couples at least one movable electrical contact (not shown) to a corresponding fixed electrical contact (not shown). The closing mechanism of circuit breaker 16 latches in a closed position such that when close coil 102 is de-energized, circuit breaker 16 remains closed. When breaker 16 closes, an "a" contact of auxiliary switch 104 also closes and a "b" contact of auxiliary switch 104 opens. The position of the "a" and "b" contacts is sensed by node electronics unit 20. To open circuit breaker 16, node electronics unit 20 energizes trip coil (TC) 100. TC 100 acts directly on circuit breaker 16 to release the latching mechanism that holds circuit breaker 16 closed. When the latching mechanism is released, circuit breaker 16 will open, opening the "a" contact and closing the "b" contact of auxiliary switch 104. Trip coil 100 is then de-energized by node electronics unit 20. After breaker 16 opens, with the close spring recharged by motor 108, circuit breaker 16 is prepared for a next operating cycle. In the exemplary embodiment, each node electronics unit 20 is coupled to circuit breaker 16 in a one-to-one correspondence. For example, each node electronics unit 20 communicates directly with only one circuit breaker 16. In an alternative embodiment, node electronics unit 20 may communicate with a plurality of circuit breakers 16.

Figure 6:
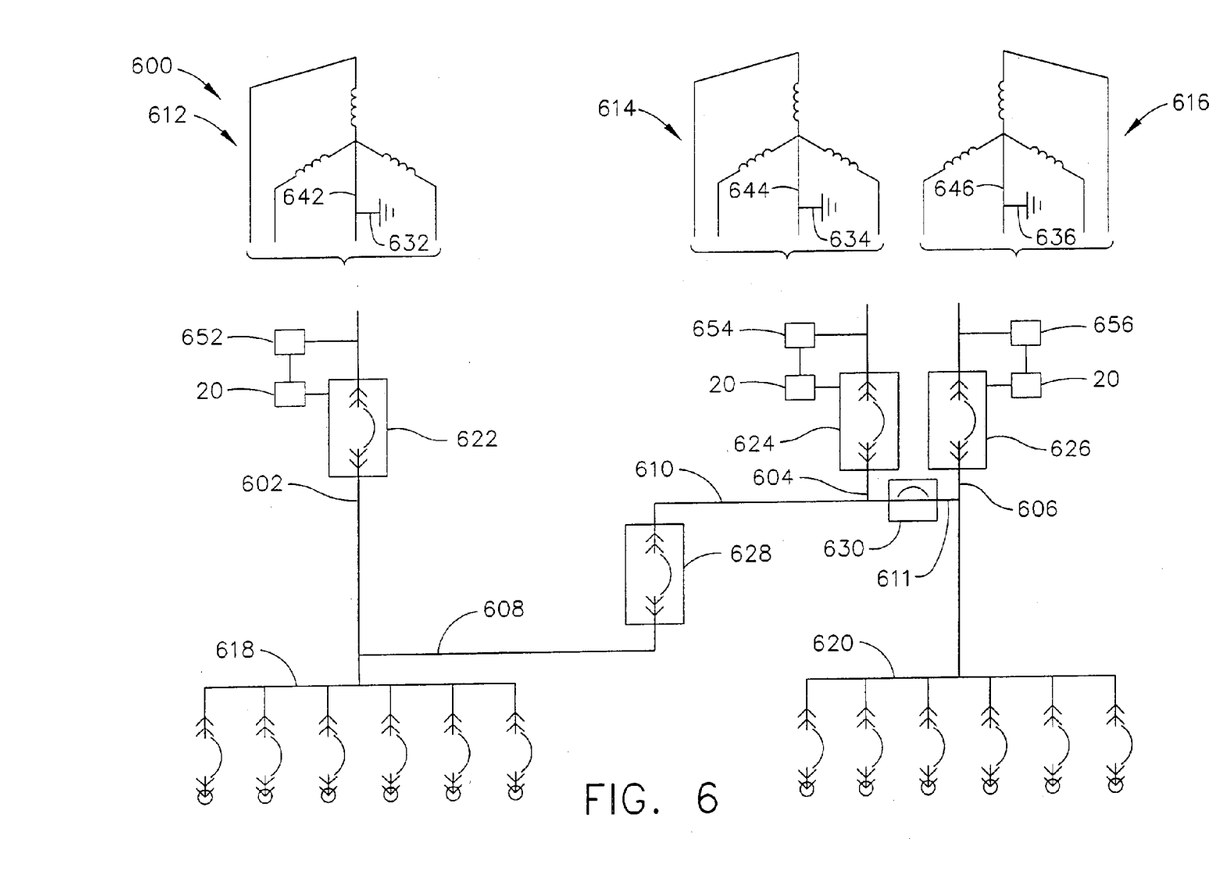
FIG. 6 is a one-line schematic diagram of an exemplary embodiment of the power distribution system shown in FIG. 1.

FIG. 6 is a one-line schematic diagram of an exemplary embodiment of power distribution system 10 shown in FIG. 1. Power distribution system 10 is illustrated as a three-phase four-wire electrical power distribution system and includes a primary circuit 600 and a plurality of sensors, for implementing, among other things, a ground fault protection scheme for protecting the primary circuit against currents caused by ground fault conditions that may occur in system 10. Primary circuit 600 consists of three main buses 602, 604 and 606 and three tie buses 608, 610, and 611 interconnecting the main buses. In the exemplary embodiment, a plurality of power sources, such as three-phase grounded-neutral transformers 612, 614, 616, supply power to a load bus 618 and a load bus 620 which are respectively connected to the main buses 602, 604 and 606 through main switches or circuit breakers 622, 624 and 626, respectively, when the main circuit breakers are closed. Opening of the main circuit breaker 622 disconnects the source 612 from its associated bus 602, opening the main circuit breaker 624 disconnects the source 614 from its associated bus 604 and opening the main circuit breaker 626 disconnects the source 616 from its associated bus 606. Tie buses 608 and 610 contain a tie switch or circuit breaker 628 that, when closed, connects the main buses 602 and 604 together and, when open, opens the tie bus 608 to disconnect the main buses from each other. Tie buses 610 and 611 contain a tie switch or circuit breaker 630 that, when closed, connects the main buses 604 and 606 together and, when open, opens the tie bus 611 to disconnect the main buses from each other. Main buses 602, 604 and 606 and tie buses 608 and 610 each consist of three phase conductors and a neutral conductor.

Sources 612, 614 and 616 are shown as each comprising a transformer secondary having three phase windings connected in wye configuration with their neutral points solidly grounded at 632, 634, and 636, respectively. The neutral point of source 612 is connected to a neutral conductor 642, while the neutral point of source 614 is connected to a neutral conductor 644 and the neutral point of source 616 is connected to the neutral conductor 646.

In the exemplary embodiment, the ground fault protection circuit is magnetically coupled to the primary circuit and is provided to protect system 10 from ground faults that may occur in the system. For example, if a ground fault occurs on the main bus 602, it is usually necessary to open main circuit breaker 622 and tie circuit breaker 628 to isolate the fault from the rest of the system. Under such circumstances, the remaining circuit breakers 624, 626, and 630 should remain in the position they were in prior to the occurrence of the ground fault to permit uninterrupted power from the sources 614 and 616 to continue over the sound buses 604, 606 and 610.

Similarly, if a ground fault should occur on the main bus 604, main circuit breaker 624 and tie circuit breakers 628 and 630 should be opened to isolate the fault from the remaining buses, while main circuit breakers 622 and 626 should remain closed to maintain power from sources 612 and 616, respectively, to main buses 602 and 606, respectively.

The ground fault tripping function of the main circuit breakers 622, 624 and 626 and the tie circuit breakers 628 and 630 are controlled by commands and action messages received from each CCPU 24 through each circuit breakers respective node electronics unit 20. Each node electronics unit 20 receives a current signal from respective current sensors 652, 654, and 656 monitoring the electrical bus proximate each node electronics unit 20 of respective circuit breakers 622, 624 and 626. All node electronics units 20 transmit the current signals associated with it's respective circuit breakers to all CCPUs 24 via network 23. Each CCPU 24 processes the current data to determine the presence of a ground fault and determines a command and action message that may be transmitted to all node electronics unit 20. Each node electronics unit 20 commands it's respective circuit breaker based on the commands and actions received from CCPUs 24.

The current sensors are responsive to the vector sum of the currents flowing through the primary conductors at the location of the individual sensor. Each of the current sensors consist of four current transformers (not shown) for sensing the current flowing in its associated phase and neutral buses. These current transformers develop current signals representative of the currents flowing in the phase and neutral buses and transmit these signals to their respective node electronics unit 20. CCPU 24 receives the current signals from node electronics unit 20. The current signals are synchronized at node electronics unit 20 such that all current signals received by CCPU 24 are representative of current values on power distribution system 10 buses within a five microsecond window of time. CCPU 24 evaluates phase and vector sums of all phase currents and all ground currents available on power distribution system 10 to determine the presence of a ground fault. Because CCPU 24 is able to examine all phase currents and all ground currents simultaneously CCPU 24 may determine ground faults in a plurality of zones predetermined by a user's requirements. Additionally, a response of CCPU 24 may vary based on changing conditions of power distribution system 10 in response to operator actions and responses to commands and actions that may be developed by CCPU 24 that are independent of a ground fault condition. An effect of circulating neutral currents may be facilitated being eliminated by sampling phase and neutral currents at a plurality of locations. From Kirchhoff's Law, it is known that current flowing into any point in a circuit is equal to the current flowing away from that point. Because CCPU 24 receives current data sampled substantially simultaneously, for example, samples taken within five microseconds of each, currents sampled from multiple locations in power distribution system 10 may be summed to facilitate errors that may be introduced by circulating neutral currents. For example, current values from a first set of sensors may be summed to determine a presence of a ground fault. Summing current values from a second different set of sensors may confirm the presence of the ground fault, or may call into question the accuracy of the determination made based on the first set of sensors. CCPU 24 is configured to resolve conflicts between current summations from different sets of sensors. The first set of sensors and the second set of sensors may have individual sensors common to each set. The determination made by the second set of sensors facilitates locating the ground fault. Additionally, on-line verification, or double-checking of protective actions may be implemented by sensing ground faults using different sets of sensors monitoring different locations of power distribution system 10. Furthermore, when a current sensor or other component fails, CCPU 24 may use other sensors in a backup determination of the presence and location of a ground fault.

Figure 7:
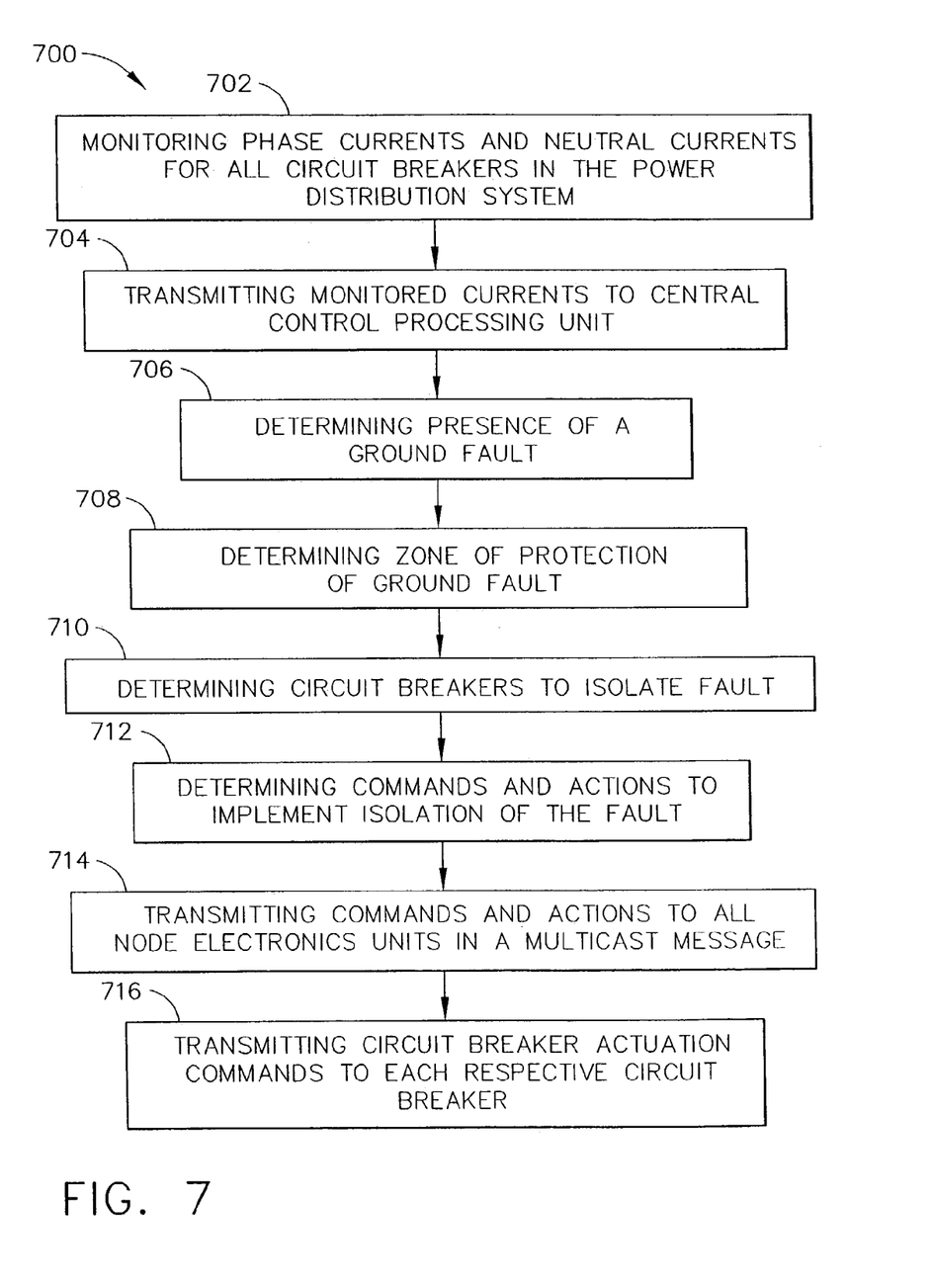
FIG. 7 is a flow diagram illustrating an exemplary embodiment a method for monitoring the centrally controlled power distribution system shown in FIG. 1.

FIG. 7 is a flow diagram illustrating an exemplary embodiment a method 700 for monitoring the centrally controlled power distribution system 10 shown in FIG. 1. Method 700 includes monitoring 702 phase conductor currents and neutral conductor currents proximate all circuit breakers in power distribution system 10. Current sensors that include a sensor for each phase of power distribution system 10 and for the neutral conductor are located proximate power distribution system 10 conductors such that each sensor is responsive to the current flowing in the conductors. The current sensors are spatially located proximate an associated circuit breaker such that current flowing through a plurality of load contacts of the circuit breaker is monitored by the associated current sensor. For example, current sensor 652 is located proximate the conductors upstream (relative to source 612) of circuit breaker 622. All current flowing through the load contacts and neutral conductor of circuit breaker 622 may be monitored 702 by current sensor 652.

Monitored currents are transmitted 704 from current sensor 652, for example, to an associated node electronics unit 20 and from node electronics unit 20 to CCPU 24 via network 23. CCPU 24 receives monitored currents from all circuit breakers in power distribution system 10 and maintains a global information set that includes, power distribution system 10 state data of which the monitored currents are a portion. From the monitored currents, CCPU 24 determines 706 the presence of a ground fault in power distribution system 10 based on summing currents entering and leaving predetermined nodes in power distribution system 10. If a ground fault is determined based on a first set, or group of sensors, CCPU 24 may double-check the determination by making an alternative determination based on a second set of sensors wherein the first and second sets of sensors are different, although individual sensors in each set may be common.

When a ground fault is determined to be present on power distribution system 10, CCPU 24 determines 708 a zone of protection for the ground fault wherein the system facilitates minimizing the loss of power to power distribution system 10 loads due to the ground fault. CCPU 24 determines a location of the ground fault to a specific bus or plurality of buses. CCPU 24 then determines 710 which circuit breakers to open to isolate the ground fault while minimizing a loss of power to loads. In the exemplary embodiment, CCPU 24 may selectively close circuit breakers to reenergize buses that are deenergized to isolate the ground fault. CCPU 24 will not automatically reenergize a faulted bus.

CCPU 24 determines 712 a command and action message to be sent to node electronics unit 20 to implement the determined fault isolation commands. CCPU 24 transmits 714 the command and action message to all node electronics unit 20 on power distribution system 10. Each node electronics unit 20 receives the message which is multicast, or broadcast to all node electronics unit 20 at the same time. Each message includes commands and actions addressed to each node electronics unit 20. For example, a power distribution system 10 may include ten circuit breakers 16 and ten associated node electronics units 20, therefore each multicast message would include ten individually addressed command and action messages, one for each node electronics unit 20.

Each node electronics unit 20 receives each command and action message and determines 716 an actuation command for its associated circuit breaker 16 based on the received command and action message and transmits the determined actuation command to its associated circuit breaker 16. Circuit breaker 16 operates to open or close as commanded by node electronics unit 20.

The above-described power distribution system network monitoring system is cost-effective and highly reliable. Each system includes at least one central control processing unit (CCPU) and a plurality of node electronics unit communicatively coupled via a high-speed digital network. There may be additional CCPUs and corresponding network backbones coupled in the power distribution system to facilitate meeting a system reliability goal. Each node electronics unit communicates to every CCPU via a digital message packet that facilitates efficient communication while maintaining a system latency requirement. Accordingly, the power distribution system communication system facilitates protection and optimization of power system operation in a cost-effective and reliable manner.

Exemplary embodiments of power distribution system communication system components are described above in detail. The components are not limited to the specific embodiments described herein, but rather, components of each system may be utilized independently and separately from other components described herein. Each power distribution system communication system component can also be used in combination with other power distribution system components.

While the invention has been described in terms of various specific embodiments, those skilled in the art will recognize that the invention can be practiced with modification within the spirit and scope of the claims.

What is claimed is:

1. A method for monitoring a power distribution system that includes a plurality of circuit breakers, the method comprising:
   sampling an electrical power condition at each of the plurality of circuit breakers in a synchronous manner;
   transmitting said electrical power condition of each of the plurality of circuit breakers to a central control processing unit;
   determining a presence and a location of a ground fault in the power distribution system based on said electrical power condition; and
   isolating the ground fault by opening one or more of said plurality of circuit breakers supplying power to the location.

2. A method in accordance with claim 1 wherein said synchronous manner ensures that said electrical power condition at each of the plurality of circuit breakers is sampled within a desired time window.

3. A method in accordance with claim 2 wherein said window is between about five microseconds to about ten microseconds.

4. A method in accordance with claim 1 wherein said presence and location of said ground fault are determined based on phasor current values.

5. A method in accordance with claim 1 wherein said electrical power condition is an electrical current flow.

6. A method in accordance with claim 1 wherein determining a ground fault presence and location comprises:
   determining a ground fault presence and location based on current values received from a first set of current sensors; and
   determining a ground fault presence and location based on current values received from a second set of current sensors wherein the first set of sensors is different than the second set of sensors.

7. A method in accordance with claim 1 further comprises determining at least one circuit breaker to open for the purpose of isolating the ground fault from a power distribution system source.

8. A method in accordance with claim 1 wherein isolating the determined ground fault comprises:
   transmitting a message from the central control processing unit to a plurality of node electronics units; and
   transmitting a circuit breaker actuation command from each node electronics unit to its respective circuit breaker, the actuation command based on the transmitted message, and the determination of the ground fault presence.

9. An apparatus for monitoring and controlling a power distribution system, comprising:
   a plurality of circuit breakers connected to a power source of the power distribution system;
   a node electronics unit in communication with a respective one of said plurality of circuit breakers, said node electronics unit being located remotely from its respective one of said plurality of circuit breakers; and
   a central processing unit in electrical communication with each of said node electronics unit, said central processing unit controlling each of said node electronics units to take a substantially synchronous sample of a condition of said power source so that said central processing unit can perform a comparison of said condition of said plurality of circuit breakers to determine a fault in the power distribution system.

10. The apparatus as in claim 9, wherein said condition is a current phasor value and said fault is a ground fault.

11. The apparatus as in claim 10, wherein said central processing unit performs said comparison to determine a location of said fault in the power distribution system.

12. The apparatus as in claim 11, wherein said central processing unit controls said plurality of circuit breakers based on said fault and said location.

13. The apparatus as in claim 9, wherein said substantially synchronous sample of said node electronics units is taken in a selected time window.

14. The apparatus as in claim 13, wherein said selected time window is between about five microseconds to about ten microseconds.

15. The apparatus as in claim 9, further comprising a digital network placing said central processing unit in electrical communication with each of said node electronics units.

16. The apparatus as in claim 15, wherein each of said node electronics units transmits a message packet to said central control processing unit via said digital network, said message packet including said condition.

17. A method for monitoring a power distribution system that includes a plurality of circuit breakers, the method comprising:
sampling an electrical power condition at each of the plurality of circuit breakers in a synchronous manner;
transmitting said electrical power condition of each of the plurality of circuit breakers to a central control processing unit;
determining a presence and a location of a ground fault in the power distribution system based on said electrical power condition, wherein determining the ground fault presence and location comprises determining a ground fault presence and location based on current values received from a first set of current sensors and determining a ground fault presence and location based on current values received from a second set of current sensors wherein the first set of sensors is different than the second set of sensors;
isolating the ground fault by opening one or more of said plurality of circuit breakers supplying power to the location; and
resolving a conflict between a first determination of the ground fault based on the first set of sensors and a second determination of the ground fault based on the second set of sensors.

* * * * *